United States Patent
Bianco (10) Patent No.: US 9,219,408 B2
(45) Date of Patent: Dec. 22, 2015

(54) TRANSITION MODE PFC POWER CONVERTER ADAPTED TO SWITCH FROM DCM TO CCM UNDER HIGH LOAD AND CONTROL METHOD

(71) Applicant: DORA S.p.A., Aosta (IT)

(72) Inventor: Alberto Bianco, Gressan (IT)

(73) Assignee: STMicroelctronics S.r.l., Agrate Brianza (IT)

( * ) Notice: Subject to any disclaimer, the term of this patent is extended or adjusted under 35 U.S.C. 154(b) by 45 days.

(21) Appl. No.: 14/321,600

(22) Filed: Jul. 1, 2014

(65) Prior Publication Data

US 2015/0002109 A1 Jan. 1, 2015

(30) Foreign Application Priority Data

Jul. 1, 2013 (IT) .............. MI2013A1097

(51) Int. Cl.
*H02M 3/156* (2006.01)
*H02M 1/42* (2007.01)

(52) U.S. Cl.
CPC .......... *H02M 1/4225* (2013.01); *H02M 1/4208* (2013.01); *Y02B 70/126* (2013.01)

(58) Field of Classification Search
CPC ... H02M 3/156; H02M 3/157; H02M 3/1586; H02M 3/1588; G05F 1/70
USPC ............ 323/207, 222, 282–285, 351; 363/59, 363/60
See application file for complete search history.

(56) References Cited

U.S. PATENT DOCUMENTS

| | | | | |
|---|---|---|---|---|
| 6,128,205 A * | 10/2000 | Bernd | .................. | H02M 1/4266 323/283 |
| 7,266,001 B1 * | 9/2007 | Notohamiprodjo | ..... | H02M 1/42 363/59 |
| 7,733,678 B1 * | 6/2010 | Notohamiprodjo | . | H02M 1/4225 323/222 |
| 2008/0211462 A1 | 9/2008 | Ng | | |
| 2008/0211463 A1 | 9/2008 | Ng | | |
| 2009/0257257 A1 * | 10/2009 | Adragna | ............. | H02M 3/1584 363/65 |
| 2010/0246226 A1 * | 9/2010 | Ku | ...................... | H02M 1/4225 363/126 |
| 2010/0253410 A1 * | 10/2010 | Tan | .................... | H03K 17/0814 327/327 |
| 2011/0199066 A1 * | 8/2011 | Shao | ................... | H02M 1/4225 323/299 |
| 2011/0261599 A1 | 10/2011 | Duerbaum et al. | | |
| 2012/0201063 A1 | 8/2012 | Sugawara | | |
| 2013/0141056 A1 | 6/2013 | Yang et al. | | |
| 2014/0097808 A1 * | 4/2014 | Clark | ....................... | G05F 1/70 323/208 |
| 2015/0155776 A1 * | 6/2015 | Castelli | ............... | H02M 1/4208 323/205 |

\* cited by examiner

FOREIGN PATENT DOCUMENTS

| IT | 1387477 A1 * | 2/2004 | ......... | H02M 1/4225 |
| IT | 1580638 A1 * | 9/2005 | ................ | G05F 1/70 |

*Primary Examiner* — Adolf Berhane
(74) *Attorney, Agent, or Firm* — Seed IP Law Group PLLC (57) ABSTRACT

A transition mode power factor correction converter comprising a boost inductor, a switch, a diode, and output tank capacitor, has circuit means of limitation of the off-time interval of the switch to a fraction of the off-time interval, "complementary" to the on-time interval that is normally controlled for regulating the output voltage, during part of a cycle of a rectified sinusoidal voltage waveform input to the converter, when the current flowing in the inductor reaches a maximum threshold, causing the mode of operation of the device to switch from transition mode to continuous current mode for a middle phase angle region of a rectified sinusoidal input voltage waveform, under high load conditions, defined by said maximum current threshold. Current peaks amplitude and ripple are effectively reduced for same output power.

15 Claims, 5 Drawing Sheets

Soft switching

TRANSITION MODE PFC POWER CONVERTER ADAPTED TO SWITCH FROM DCM TO CCM UNDER HIGH LOAD AND CONTROL METHOD

BACKGROUND

1. Technical Field

The disclosure relates to a transition mode (TM) power factor corrector (PFC) power converter adapted to switch from a DCM (discontinuous current mode) to a CCM (continuous current mode) under high load.

2. Description of the Related Art

Transition mode (also known as quasi resonant) boost power factor corrector devices (PFC) function in a discontinuous current mode (DCM) and have a high efficiency. However, for a same average current value, in DCM the power transfer current reaches higher peak values of than in a switching power converter functioning in a continuous current mode (CCM). This is due to the fact that the transition mode peculiarity of requiring a nullification of the current in the inductor at every switching cycle has the drawback of producing a current ripple of amplitude that is about twice the value of the waveform of the average current.

In a PFC (power factor correction) power converter there is a current loop through a boost inductor from where a loop signal is derived for implementing an effective and reliable control of the output DC voltage. In transition mode, a constant on-time control timer of the switch of the boost inductor is generally employed for regulating the power transfer to track load requirements. Commonly, the on-time interval of the switch is set in function of the output voltage. Therefore, if the load remains constant the on-time remains constant too.

Switching from the discontinuous current mode of a TM-PFC circuit to a continuous current mode of operation for reducing the ripple amplitude specially under heavy load conditions is desirable.

The ability to switch from a DCM (discontinuous current mode) to a CCM (continuous current mode) under high load conditions generally requires a complex control circuitry, given that the common technique, based on an on-time control timer of the switch of the boost inductor, relies on a null initial current for obtaining a current proportional to the instantaneous input voltage and thus is unsuitable.

The document, Publ. No. U.S. 2013/0141056-A1, addresses a specific problem of difference between current loop gains when the PFC power converter operates in a CCM (continuous current mode) and in a DCM (discontinuous current mode).

An effective, though much simplified control method for reliably and efficiently switching a from DCM to CCM a transition mode (TM) power factor corrector (PFC) power converter is highly desired.

BRIEF SUMMARY

An exemplary embodiment of a control circuit of a transition mode (TM) power factor corrector (PFC) power converter adapted to switch from a DCM (discontinuous current mode) to a CCM (continuous current mode) when the instantaneous current in the inductor reaches a threshold value, of outstandingly simple implementation is provided.

The transition mode (TM) power factor correction device typically comprises a boost inductor, a switch, a diode, an output tank capacitor, circuit means for sensing a condition of zero current in the inductor, circuit means for turning on the switch when a zero current condition through the inductor is detected and for turning off the switch after a set on-time interval (Ton) has elapsed.

According to this disclosure, dedicated circuit means limit the off-time interval of the switch to a fraction of a complementary off-time interval (Toff) of the switch during part of a cycle of a rectified sinusoidal voltage waveform input to the converter, when the current flowing in the inductor reaches a given maximum threshold.

Generally, the maximum off-time may be limited to $Toff=Toff_0 \sin\theta / \sin\theta_0$, in correspondence of a central portion of the input line voltage cycle given by: $\theta = \pi - \theta_0$, where $Toff_0$ is the off-time interval measured at the phase angle $\theta_0$ of the input sinusoid, at which said maximum current threshold is reached, thus causing the mode of operation of the device to switch from TM to CCM for a phase angle interval region of a rectified sinusoidal input voltage waveform centered on $\pi/2$ as defined by said maximum current threshold, under high load conditions.

An exemplary embodiment of a method for controlling a power factor correction (PFC) converter is also provided. The method comprises the steps of:

(a) setting a maximum off-time timer of the switch of the boost inductor to a value beyond any expected maximum off-time value or to infinity;

(b) sensing the current flowing in the inductor and issuing an interrupt request (IRQ) signal to a microcontroller when the current reaches a set maximum threshold;

(c) measuring the off-time of the switch after said IRQ or at every switching cycle;

(d) setting said maximum off-time timer to a maximum off-time limit corresponding to the off-time measured at the instant of generation of said IRQ or measured during a switching cycle antecedent said instant of generation of the IRQ, according to the option of step c);

(e) either maintaining the maximum off-time limit setting of said timer for twice the duration of the sinusoidal input voltage waveform decreased by the time elapsed to the instant of generation of a first IRQ or updating the off-time limit setting, according to the option of step c), for a central portion of a sinusoidal input voltage waveform; and (f) resetting the maximum off-time limit to said value beyond any expected maximum value or to infinity.

Of course, the maximum current threshold that may be set at the design stage or programmed depending on the contemplated specific conditions of relatively high current loads, will determine at which load the PFC circuit will begin undergoing a switching from DCM to CCM at or in the neighborhood of the peak (i.e., at $\pi/2$) of a rectified sinusoidal input voltage waveform, and the angular breath of such a middle region of the input waveform, during which the CCM mode of operation will be retained.

A detailed description is given in the following embodiments with reference to the accompanying drawings.

BRIEF DESCRIPTION OF THE SEVERAL VIEWS OF THE DRAWINGS

The disclosure may be more fully understood by reading the subsequent detailed description and examples with references made to the accompanying drawings, wherein.

DETAILED DESCRIPTION

The following description has the purpose of illustrating the general principles of the disclosure being claimed and should not be taken in a limiting sense. The scope of the disclosure is best determined by reference to the appended claims.

The peculiar aspects of this disclosure are here after described for the case of one of common PFC circuit configurations though the characteristic features of the disclosure that will be described may be embodied in any other PFC circuit configuration commonly being used by adapting, in the described exemplified manner, the control circuit of the transition mode (TM) power factor corrector (PFC) power converter to make it switch from a DCM (discontinuous current mode) to a CCM (continuous current mode) under heavy load.

Figure 1:
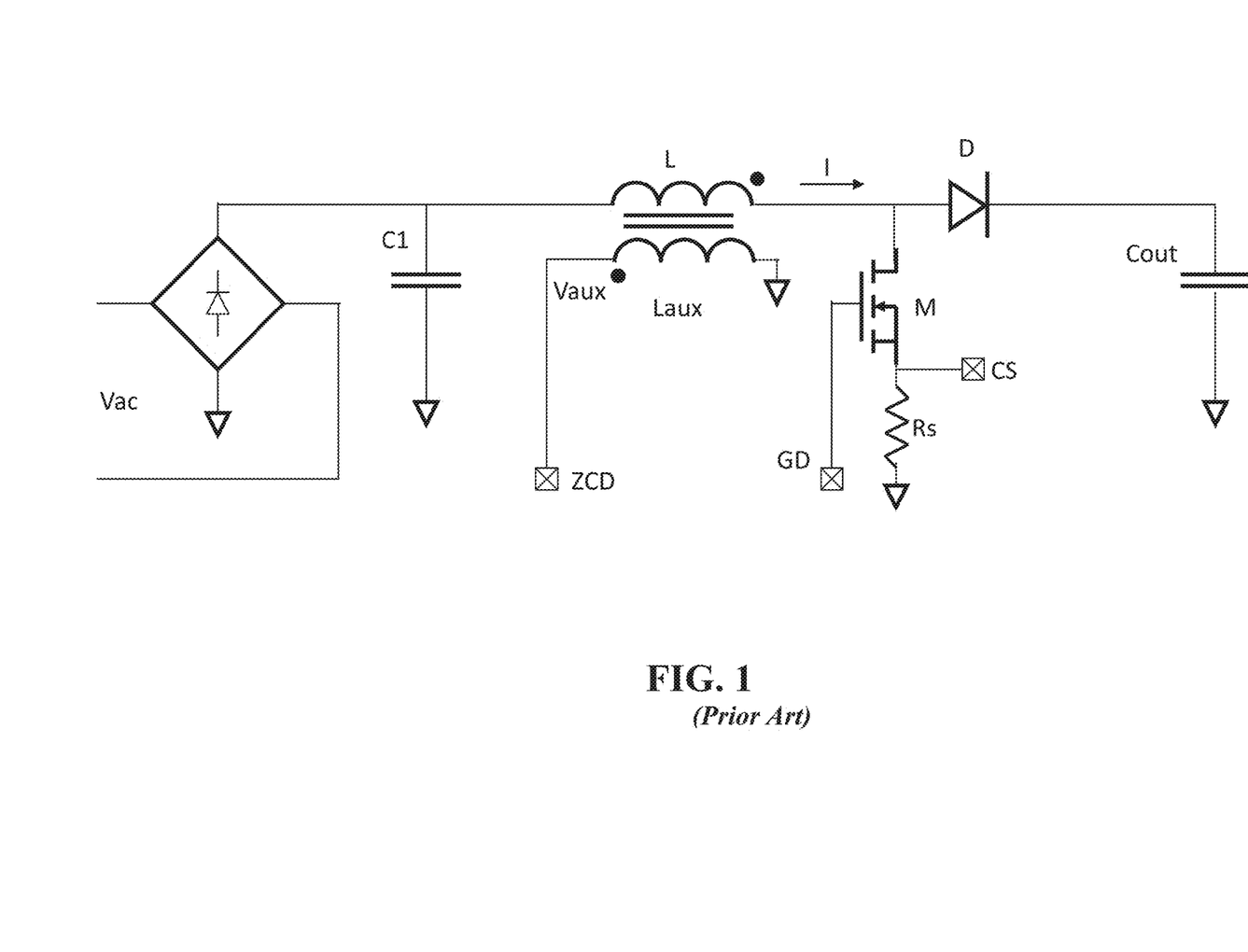
FIG. 1 shows the basic circuit of a PFC power converter.

Basically, a common example as depicted in FIG. 1, a transition mode (TM) power factor correction device comprises a boost inductor L, a switch M, a diode D, an output tank capacitor Cout and a zero crossing detector for sensing a condition of zero current (or zero crossing) in the boost inductor.

In the contemplated example, an auxiliary winding Laux is magnetically coupled with the inductor as one exemplary way of implementing the zero crossing detector for sensing a condition of zero current (or zero crossing) in the boost inductor. However, other ways, equally familiar to the skilled reader, may be chosen, for example a sense resistor in a recirculation current path of the boost inductor through the ground node may be used in lieu of an auxiliary winding. Control circuit means, commonly based on a microcontroller, may be used for controlling the generation and delivery of a drive signal to the GD node, commonly a square wave, for turning on the switch M when a zero current condition through the inductor is detected (in the considered example by monitoring the voltage on the ZCD sense node), and for turning off the switch after an on-time interval (Ton) timer set by the controller has elapsed. On the sense node CS may be monitored the current that charges the boost inductor L during the on-time pulse applied to the gate of the switch M.

The basic circuit of FIG. 1, also shows a common condition of direct AC line feed of the switching PFC power converter through a full bridge rectifier and filter capacitor C1.

Figure 2:
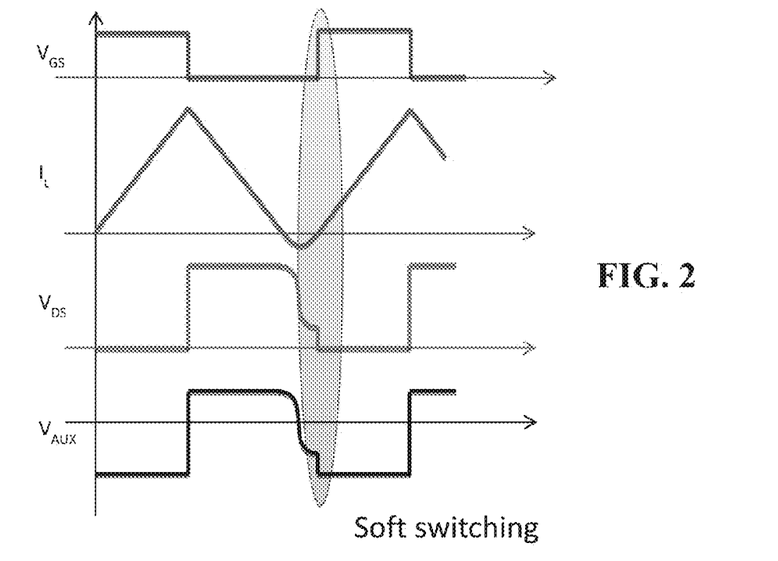
FIG. 2 shows DCM waveforms of relevant signals of the basic circuit of FIG. 1.

In FIG. 2 are depicted the waveforms of relevant signals of the PFC circuit of FIG. 1 according to a typical transition mode (TM) (some time referred to as "quasi resonant switching mode" in the related technical literature) of operation of the circuit.

The drive signal $V_{GS}$ of the diode M is a square wave. In transition mode, each time the switch is turned on and then off, the controller waits for the current on the boost inductor L to reach zero before turning on again the switch. The timing diagrams illustrate how the turn on instant is controlled in order to produce a transition mode.

As graphically emphasized in FIG. 2, when the current reaches zero, a resonance is stimulated that has the effect of decreasing the voltage $V_{DS}$ on the drain of the switch M thus ensuring a so-called "soft switching" (i.e., at null current and reduced voltage).

In the considered example, the voltage Vaux on the auxiliary winding Laux is proportional to the voltage on the boost inductor L. When the current through the diode D becomes null, it initially reverses its direction and, after recovery, the diode stops conducting. At this point, the current in the inductor L that has assumed a negative sign discharges the drain/source capacitance of the switch M thus favoring a soft switching. Because of the proportionality of Vaux with the voltage on the inductor L, the auxiliary winding Laux is exploited for detecting when the drain/source capacitance is discharging itself in order to switch on again M at the correct instant.

Figure 3:
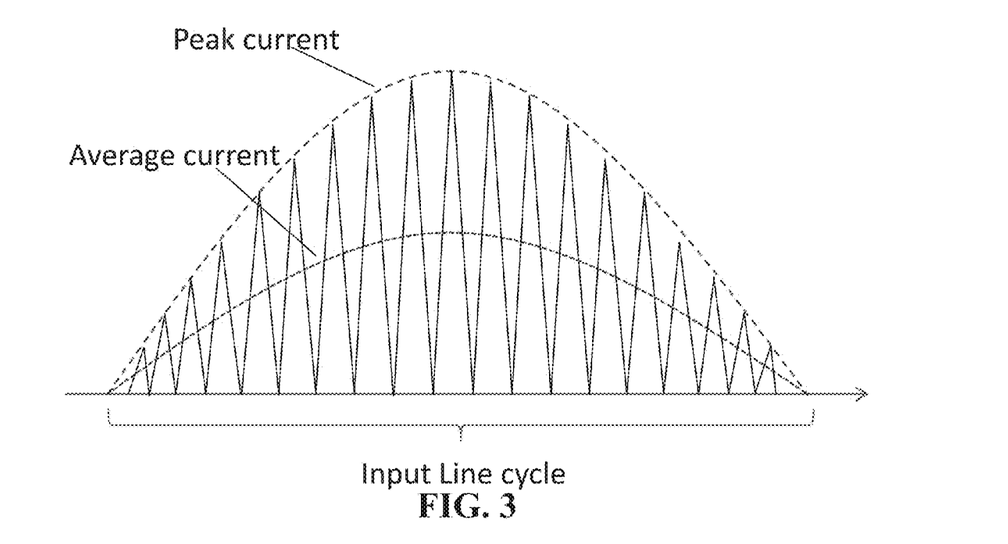
FIG. 3 shows the typical discontinuous current waveform for an input line cycle of a rectified AC sinusoidal feed voltage input to the PFC power converter operating in a transition mode (TM)

FIG. 3 shows the typical discontinuous current waveform for a cycle of a rectified AC sinusoidal feed voltage input to the PFC power converter operating in a transition mode (TM). The output DC power and input current waveform are controlled by regulating the duration of the on-pulse of the gate drive signal of the switch. The on-time interval of the switch is commonly set by the controller in function of the output voltage. Therefore, if the load remains constant the on-time remains constant too. Because the current at the beginning of the cycle is constant, the peak current is Ton*Vin/L, that is it is proportional to the input voltage (which is in fact the target behavior of a PFC). In this respect, a constant on-time is unsuited for a continuous current mode because it relies on a zero initial current to obtain a current pulse of amplitude proportional to the input line voltage.

The transition mode peculiarity of requiring a nullification of the current $I_L$ in the inductor at every switching cycle, has the drawback of producing a current ripple of amplitude that is about twice the average value of the power transfer current (i.e., the average current).

At heavy load, the current peaks may reach large amplitudes and this has several undesirable effects:

1. the boost inductor M must be dimensioned such to exclude the possibility of saturating and the relatively large amplitude of the current peaks in transition mode of operation of the PFC circuit dictates a significant "oversizing" if related to the average current amplitude;

2. a large ripple as typical of a transition mode of operation of the PFC circuit imposes the use of large (electromagnetic interference (EMI) filters.

Switching to a CCM mode when the amplitude of the current peaks surpasses a design threshold value reduces both the above noted effects, allowing significant reduction of size and cost of inductors and EMI filters.

According to an embodiment of the method herein disclosed, the following steps are implemented:

(a) setting a maximum off-time timer of the switch of the boost inductor to a value beyond any expected maximum off-time value or to infinity;

(b) sensing the current flowing in the inductor and issuing an IRQ signal to a microcontroller when the current reaches a set maximum threshold;

(c) measuring the off-time of the switch after said IRQ or at every switching cycle;

(d) setting said maximum off-time timer to a maximum off-time limit corresponding to the off-time measured at the instant of generation of said IRQ or measured during a switching cycle antecedent said instant of generation of the IRQ, according to the option of step c);

(e) either maintaining the maximum off-time limit setting of said timer for twice the duration of the sinusoidal input voltage waveform decreased by the time elapsed to the instant of generation of a first IRQ or updating the off-time limit setting, according to the option of step c), for a central portion of a sinusoidal input voltage waveform; and (f) resetting the maximum off-time limit to said value beyond any expected maximum value or to infinity.

By this method of simple implementation, the off-time of the switch may, according to a first exemplary embodiment, be limited to $Toff=Toff_0 \sin\theta/\sin\theta_0$, during a central portion of the input line voltage cycle given by $\theta=\pi-\theta_0$, where $Toff_0$ is the off-time interval measured at the phase angle $\theta_0$, of the input sinusoid at which said maximum current threshold is reached. Of course, the controller has means for determining the phase angle $\theta_0$ at the instant of at least said first IRQ.

Figure 4:
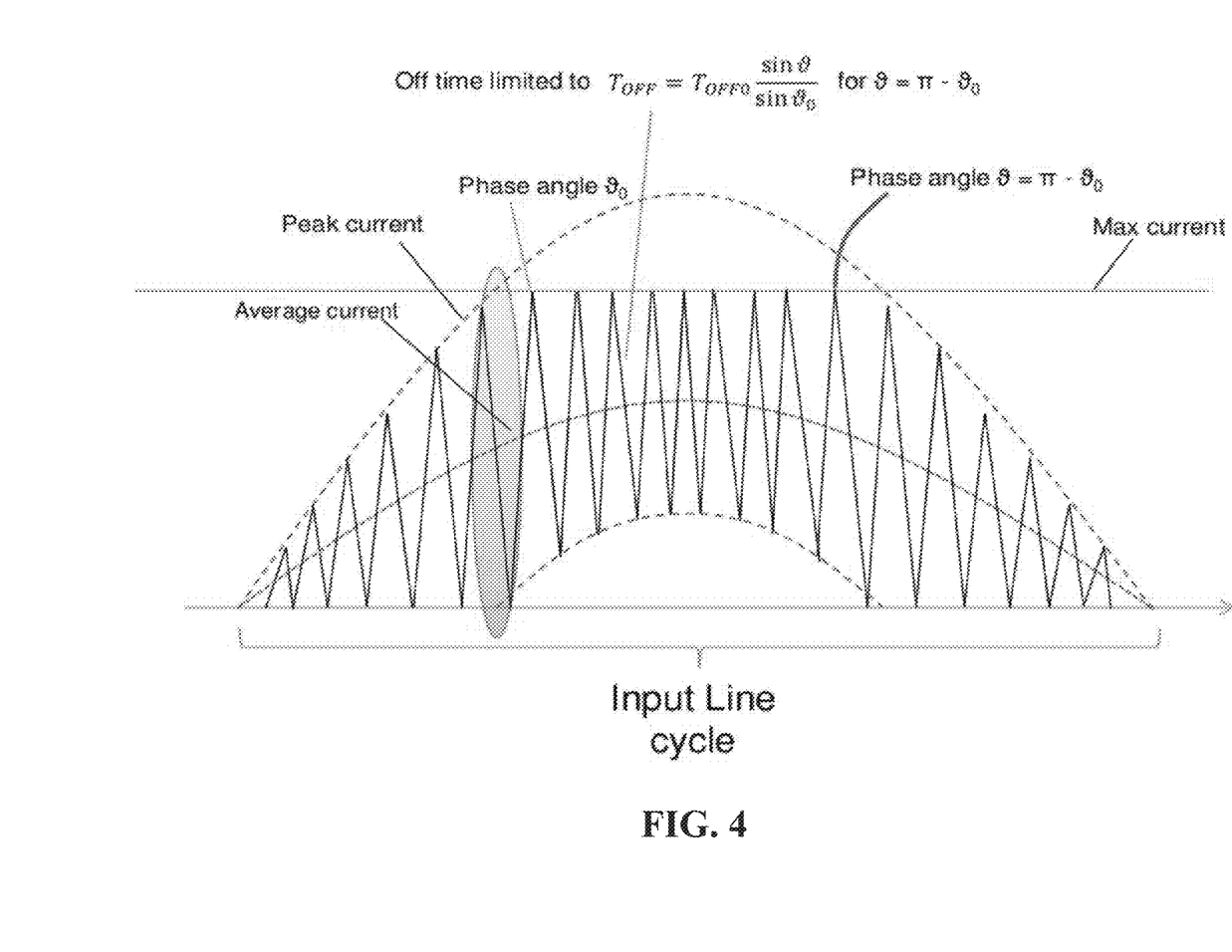
FIG. 4 shows a current waveform for a cycle of a rectified AC sinusoidal feed voltage input to the PFC power converter switching from an initial discontinuous current mode of operation to a continuous current mode of operation according to a first exemplary embodiment of this disclosure.

The resultant current waveform for a cycle of a rectified AC sinusoidal voltage input to the PFC power converter is depicted in FIG. 4. The effects of switching from an initial discontinuous current mode of operation to a continuous current mode of operation for a central portion of the input line cycle defined by the set value of maximum current threshold are evident. In particular the "compression" of the amplitude of the current peaks and the accompanying increment-decrement of the switching frequency.

Figure 5:
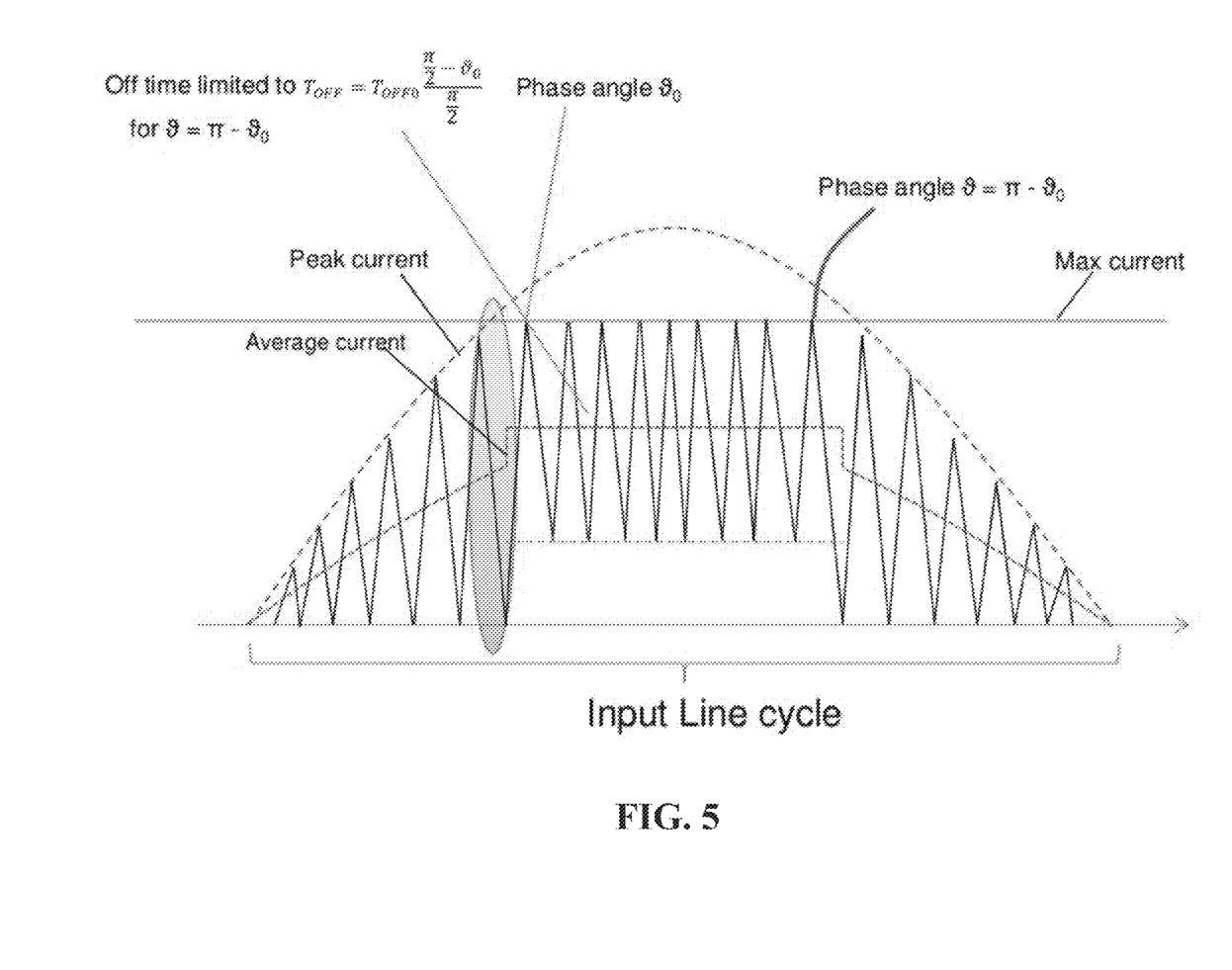
FIG. 5 shows a current waveform for a cycle of a rectified AC sinusoidal feed voltage input to the PFC power converter switching from an initial discontinuous current mode of operation to a continuous current mode of operation according to a second exemplary embodiment of this disclosure of a further simplified implementation.

According to an alternative embodiment that entails a reduced calculation complexity by the controller, the off-time of the switch may be limited to $Toff=Toff_0((\pi/2-\theta_0)/\pi/2)$, during the same central portion of the input line cycle given by $\theta=\pi-\theta_0$. The resultant current waveform for a cycle of a rectified AC sinusoidal voltage input to the PFC power converter is depicted in FIG. 5. The effects of switching from an initial discontinuous current mode of operation to a continuous current mode of operation for the central portion of the input line cycle, defined by the set value of maximum current threshold are evident also for this alternative embodiment of reduced calculation burden.

Figure 6:
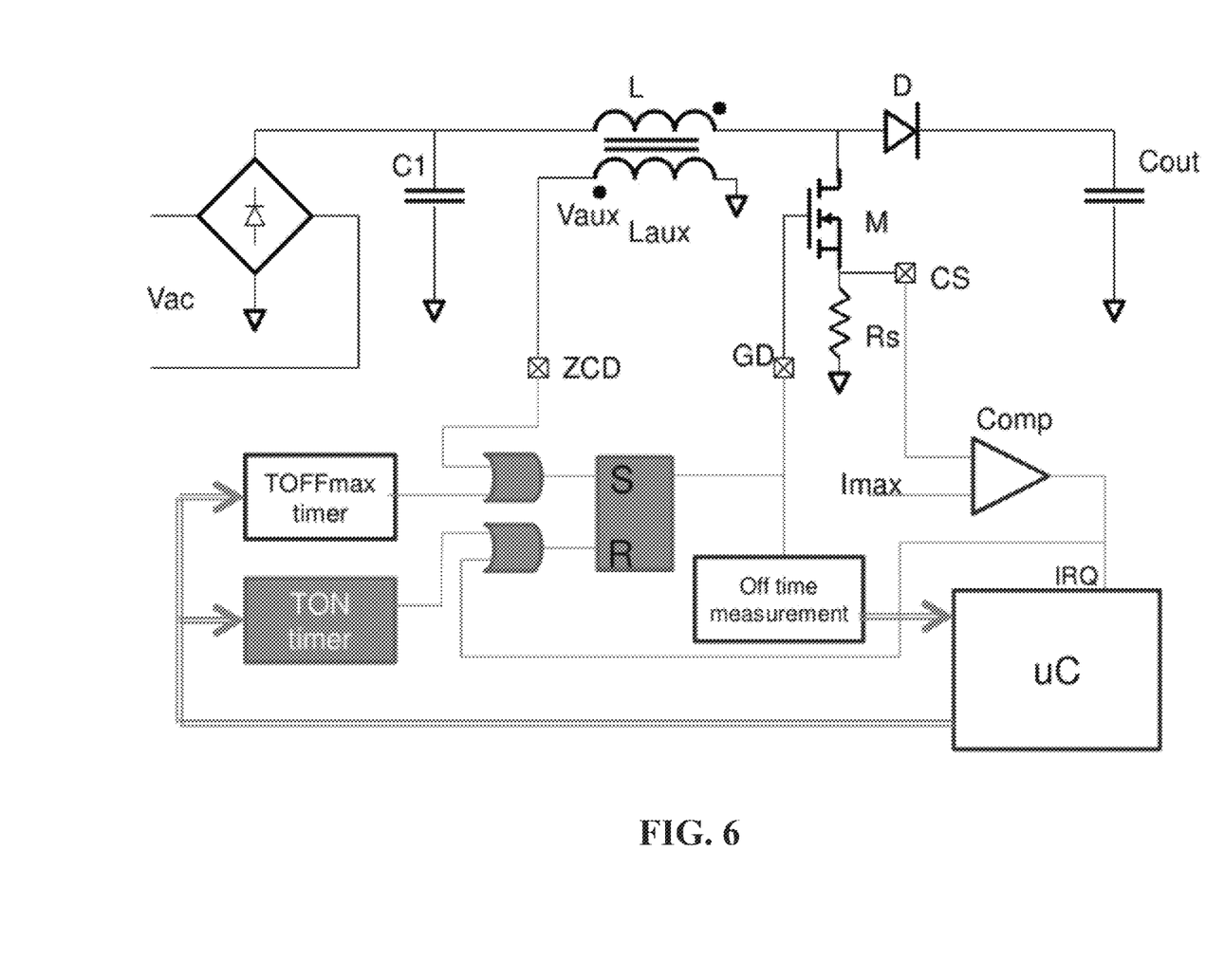
FIG. 6 shows an exemplary embodiment of a basic implementing circuit.

An exemplary embodiment of hardware implementation is illustrated in the circuit diagram of FIG. 6.

A classical control circuit based on the use of a "TON timer" for controlling the duration of the on time interval of the switch M that is set by a controller μC, completing a common, output voltage regulation loop (not shown in the drawing, being immediately figured out by any expert technician), may be modified as shown and described herein below for implementing the method of this disclosure.

A comparator "Comp" of a sense signal proportional to the current flowing through the switch M during a charge phase of the inductor L, issues a logic signal that is sent to an IRQ input pin of the controller μC, when the sensed current reaches a maximum current threshold value Imax. The threshold Imax may be set in a hardwired fashion when designing the PFC circuit or programmed through the controller μC.

A "TOFFmax timer" of the off-time following a turning on instant of the switch (M) is set by default by the controller μC to a limit count amply exceeding any possible situation or to infinity (e.g., by disabling the counter output).

An "Off-time measurement" counter provides a measure of the off-time interval following every turning on instant of the switch M to the controller μC that resets it and, on the basis of the angular position relative to the rectified AC sinusoidal voltage waveform at the triggering instant of the IRQ signal and of the last measured or next measured off-time interval Toff, calculates a maximum off-time limit count at which it sets the "TOFFmax timer".

Such a calculated maximum off-time limit may be maintained for twice the duration of the sinusoidal input voltage waveform, decreased by the time elapsed to the instant of generation of a first IRQ, that is to say for a whole central portion of the rectified sinusoidal input voltage waveform before a new default setting. Alternatively, the maximum off-time limit may be calculated at every switching cycle and repeatedly updated in the "TOFFmax timer" for the whole central portion of the rectified sinusoidal input voltage waveform, at the end of which the timer is again set to the default value.

Other "intermediate" options may also be satisfactory, keeping in mind that a repeated updating will favor a more precise tracking of the input sinusoid.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transition mode power factor correction converter comprising:
   a boost inductor;
   a switch coupled to the boost inductor;
   a zero current detector configured to sense a zero current condition in the inductor
   a control circuit configured to:
      turn on the switch in response to the zero current condition being detected,
      turn off the switch after a set on-time interval has elapsed, and
      limit an off-time interval of the switch to a fraction of a complementary off-time interval (Toff) of the switch during part of a cycle of a rectified sinusoidal input voltage waveform input to the converter, when current flowing in the inductor reaches a maximum current threshold, causing a mode of operation of the device to switch from discontinuous current mode to continuous current mode for a middle phase angle region of the rectified sinusoidal input voltage waveform under high load conditions, defined by said maximum current threshold.

2. The transition mode power factor correction converter of claim 1, wherein said fraction is defined by implementing a simplified function $Toff=Toff_0((\pi/2-\theta_0)/\pi/2)$, during the portion of cycle $\theta=\pi-\theta_0$, where $Toff_0$ is the off-time interval measured at the angle $\theta_0$ at which said maximum current threshold is reached.

3. The transition mode power factor correction converter of claim 1, wherein said control circuit comprises:
- a comparator configured to compare the current flowing through the switch and generate a logic signal when the current reaches said maximum current threshold;
- a counter configured to produce an off-time measurement of the off-time of the switch;
- a microcontroller configured to receive said generated logic signal on an interrupt request input pin and the off-time measurement produced by said counter, set an on-time timer, and limit a maximum off-time timer of the switch to said fraction.

4. The transition mode power factor correction converter of claim 1, wherein said fraction is defined by implementing a function $Toff=Toff_0 \sin \theta / \sin \theta_0$, during a portion of cycle $\theta=\pi-\theta_0$, where $Toff_0$ is the off-time interval measured at the angle $\theta_0$ at which said maximum current threshold is reached.

5. The transition mode power factor correction converter of claim 4, wherein said control circuit includes a microcontroller configured to calculate the current phase angle $\theta$ of the sinusoidal input voltage waveform.

6. The transition mode power factor correction converter of claim 4, wherein said zero crossing detector includes an auxiliary winding magnetically coupled with the inductor.

7. A method of controlling a transition mode power factor correction converter that includes a boost inductor and a switch coupled to the boost conductor, the method comprising:
- sensing a zero current condition in the inductor;
- turning on the switch in response to detecting the zero current condition in the inductor; and
- turning off the switch after a set on-time interval has elapsed;
- limit an off-time interval of the switch to a fraction of a complementary off-time interval (Toff) of the switch during part of a cycle of a rectified sinusoidal input voltage waveform input to the converter, when current flowing in the inductor reaches a maximum current threshold, causing a mode of operation of the device to switch from discontinuous current mode to continuous current mode for a middle phase angle region of the rectified sinusoidal input voltage waveform under high load conditions, defined by said maximum current threshold.

8. The method of claim 7, wherein limiting the off-time interval includes:
- setting a maximum off-time timer, which is configured to set a maximum-off time the switch, to a value beyond an expected maximum off-time value or to infinity;
- sensing the current flowing in the inductor and issuing an interrupt request (IRQ) signal to a microcontroller when the current reaches a set maximum threshold;
- measuring the off-time of the switch after said IRQ or at every switching cycle;
- setting said maximum off-time timer to a maximum off-time limit corresponding to the off-time measured at an instant of issuing said IRQ or measured during a switching cycle antecedent to the cycle during which the IRQ is issued;
- either maintaining the maximum off-time limit setting of said timer for twice a duration of the sinusoidal input voltage waveform decreased by a time elapsed to the instant of generation of the IRQ or updating the off-time limit setting, according to measuring the off-time of the switch after said IRQ or at every switching cycle, for a central portion of a sinusoidal input voltage waveform; and
- resetting the maximum off-time limit to said value beyond the expected maximum value or to infinity.

9. The method of claim 8, wherein sensing the zero current condition includes sensing the zero current condition using an auxiliary winding magnetically coupled with the inductor.

10. A transition mode power factor correction converter comprising:
- a boost inductor;
- a switch coupled to the boost inductor;
- first circuit means for sensing a zero current condition in the inductor;
- second circuit means for turning on the switch in response to the zero current condition being detected and for turning off the switch after a set on-time interval has elapsed, having limitation means for limiting an off-time interval of the switch to a fraction of a complementary off-time interval (Toff) of the switch during part of a cycle of a rectified sinusoidal input voltage waveform input to the converter, when current flowing in the inductor reaches a maximum current threshold, causing a mode of operation of the device to switch from discontinuous current mode to continuous current mode for a middle phase angle region of the rectified sinusoidal input voltage waveform under high load conditions, defined by said maximum current threshold.

11. The transition mode power factor correction converter of claim 10, wherein said fraction is defined by implementing a simplified function $Toff=Toff_0((\pi/2-\theta_0)/\pi/2)$, during the portion of cycle $\theta=\pi-\theta_0$, where $Toff_0$ is the off-time interval measured at the angle $\theta_0$ at which said maximum current threshold is reached.

12. The transition mode power factor correction converter of claim 10, wherein said limitation means include:
- a comparator configured to compare the current flowing through the switch and generate a logic signal when the current reaches said maximum current threshold;
- a counter configured to produce an off-time measurement of the off-time of the switch; and
- a microcontroller configured to receive said generated logic signal on an interrupt request input pin and the off-time measurement produced by said counter, set an on-time timer, and limit a maximum off-time timer of the switch to said fraction.

13. The transition mode power factor correction converter of claim 10, wherein said fraction is defined by implementing a function $Toff=Toff_0 \sin \theta / \sin \theta_0$, during a portion of cycle $\theta=\pi-\theta_0$, where $Toff_0$ is the off-time interval measured at the angle $\theta_0$ at which said maximum current threshold is reached.

14. The transition mode power factor correction converter of claim 13, wherein said second circuit means include a microcontroller configured to calculate the current phase angle $\theta$ of the sinusoidal input voltage waveform.

15. The transition mode power factor correction converter of claim 13, wherein said first circuit means comprise an auxiliary winding magnetically coupled with the inductor.

* * * * *

UNITED STATES PATENT AND TRADEMARK OFFICE
CERTIFICATE OF CORRECTION

PATENT NO. : 9,219,408 B2  
APPLICATION NO. : 14/321600  
DATED : December 22, 2015  
INVENTOR(S) : Alberto Bianco Page 1 of 1

It is certified that error appears in the above-identified patent and that said Letters Patent is hereby corrected as shown below:

Title Page

Item (73):
"STMicroelctronics S.r.l., Agrate Brianza (IT)" should read, --STMicroelectronics S.r.l., Agrate Brianza (IT)--.

Item (56):
"IT    1387477 A1    2/2004" should read, --EP    1387477 A1    2/2004--.

Item (56):
"IT    1580638 A1    9/2005" should read, --EP    1580638 A1    9/2005--.

Signed and Sealed this  
Tenth Day of May, 2016

Michelle K. Lee  
*Director of the United States Patent and Trademark Office*